May 20, 1958

B. T. JOYCE 2,835,825

PHOTOCURRENT AMPLIFIERS

Filed April 5, 1956

INVENTOR
BRADFORD T. JOYCE

BY *Jean C. Chognard*

ATTORNEY

United States Patent Office 2,835,825
Patented May 20, 1958

2,835,825

PHOTOCURRENT AMPLIFIERS

Bradford T. Joyce, Concord, Mass., assignor to Electronics Corporation of America, a corporation of Massachusetts Application April 5, 1956, Serial No. 576,458

4 Claims. (Cl. 250—214)

This invention relates to photocurrent amplifiers.

Some photoconductors have a photocurrent which, under normal operating conditions, is only a fraction of their dark current. Lead sulfide is such a photoconductor, and this invention will therefore be described in connection with a lead sulfide cell.

The dark resistance of a lead sulfide cell varies inversely with temperature, while its photocurrent is practically unaffected by temperature changes. Thus, although temperature changes have a marked effect on the total amount of current flowing through a lead sulfide cell, a given radiation increment causes, through the cell, a current increment which is substantially independent of temperature.

In order to derive from a photoconductive cell a signal which is a function of radiation changes, it is usual to connect the cell in series with a load resistance and a voltage source, and to measure the voltage change across the cell. As the temperature increases, the dark current increases while the photocurrent due to a given radiation change remains substantially constant. Since the circuit thus obtained yields a signal the magnitude of which is a function of the relative change in total current through the cell, the sensitivity of this circuit decreases as the temperature rises. This characteristic is undersirable in applications when the cell has to operate over a wide range of temperatures. One such application is that of fire detection in aircraft where it is commonly specified that the detector has to operate over temperatures ranging from —65° Fahrenheit to +400° Fahrenheit.

It is therefore one of the objects of this invention to provide a photocurrent amplifier yielding a signal which is a function of radiation changes and which is substantially independent of the temperature at which the photoconductive cell operates.

The above circuit is often modified by replacing the single cell by two or more cells connected either in series or in parallel. In either case, the addition of cells lowers the sensitivity of the circuit to a given radiation change affecting one of the cells. This is undesirable in applications where, as in aircraft fire detection, a plurality of detection cells are used to supervise different areas.

It is therefore another object of this invention to provide a photocurrent amplifier which may be used with a plurality of photoconductive cells without a loss in sensitivity or signal output.

In accordance with the illustrated embodiment of the present invention, the voltage applied across one or more photoconductive cells remains substantially constant regardless of cell resistance. Changes in cell resistance due to radiation changes result in cell current changes. The signal obtained is a function of these current changes.

Other and incidental objects of the present invention will be apparent to those skilled in the art from a reading of the following specification and an inspection of the accompanying drawings in which.

Figure 1:
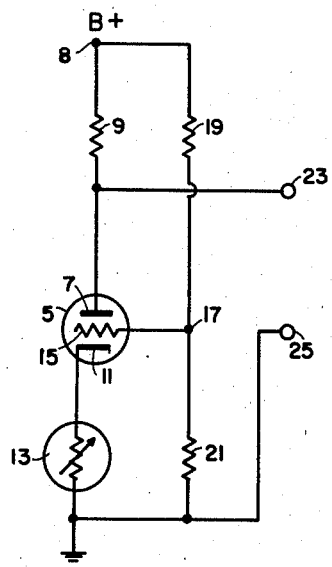
Figure 1 is a circuit diagram of one embodiment of the present invention.

Referring now to Figure 1, there is shown an electron tube such as triode 5. The anode 7 of triode 5 is connected to the positive terminal 8 of a B supply source through a load resistor 9. The cathode 11 of triode 5 is connected to a point of reference potential, such as ground, through a photoconductive cell 13. The control grid 15 of triode 5 is connected to the junction 17 of resistors 19 and 21 which are connected in series between the B supply terminal and ground. Two output terminals 23 and 25 are connected to anode 7 and to ground respectively.

The operation of the circuit of Figure 1 is as follows: the potential at the control grid 15, which is obtained from the voltage divider comprising resistors 19 and 21, remains substantially constant. The potential at the cathode 11 also tends to remain constant due to cathode follower action. Thus the voltage across the photoconductive cell 13 remains unchanged in spite of changes in the dark resistance of the cell 13 due to variations in temperature. A photocurrent change (due to a change in radiation intensity) results in voltage change across the load resistor 9, which voltage change is proportional to the photocurrent change.

Figure 2:
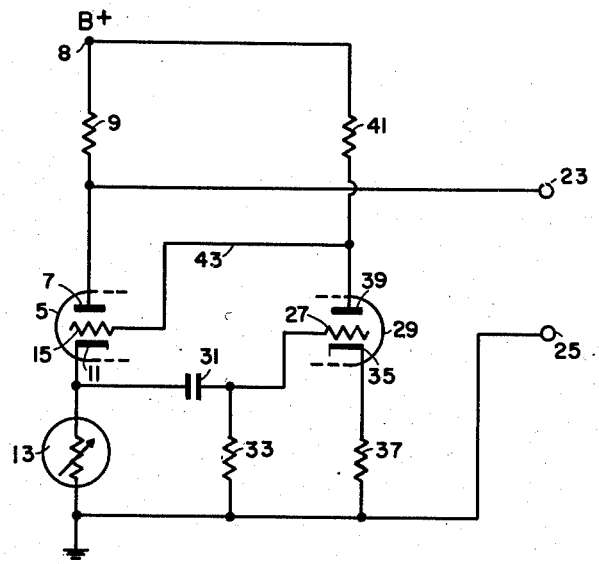
Figure 2 is a circuit diagram of another embodiment of the present invention incorporating a feed-back amplifier.

Although, in the circuit of Figure 1, the voltage across the photoconductive cell 13 remains substantially constant, it is still subject to small variations. In the circuit of Figure 2 these small variations are reduced by incorporating a feed-back amplifier between the cathode 11 and the grid 15 of triode 5. The cathode 11 of triode 5 is connected to the control grid 27 of triode 29 through a capacitor 31. Triode 29 has its control grid 27 connected to ground through resistor 33, its cathode 35 connected to ground through resistor 37 and its anode 39 connected to the positive terminal 8 of the B supply through resistor 41. A feed-back lead 43 is connected between anode 39 and control grid 15. Thus, variations in the potential at the cathode 11 of triode 5 are fed to the control grid 27 of triode 29. These variations are amplified, inverted and fed back out-of-phase to the control grid 15 of triode 5. This feed-back reduces these variations by a factor approximately equal to the grain in triode 29.

Figure 3:
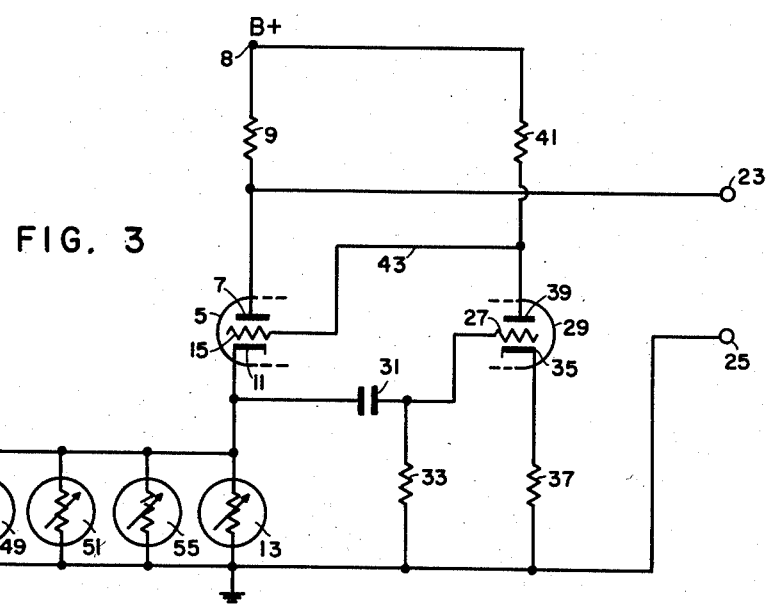
Figure 3 is a modification of the circuit of Figure 2 in which use is made of a plurality of photoconductive cells connected in parallel.

The circuit of Figure 3 is a modification of the circuit of Figure 2 in which a plurality of photoconductive cells 45, 47, 49, 51 and 53 are connected in parallel to each other and to photoconductive cell 13. The addition of these cells to the circuit of Figure 2 does not lower its sensitivity as long as it does not increase the current through triode 5 beyond its current rating. A given amount of radiation impinging on any one of the cells results in the same change in current between the cathode 11 and ground. This change in current yields the same signal between output terminals 23 and 25.

I claim:

1. A photocurrent amplifier comprising: a power supply having positive and negative terminals, an electron tube having an anode, a cathode and a control electrode, a photoconductor connected between said cathode and the negative terminal of said power supply, a resistor connected from said anode to the positive terminal of said power supply, means to maintain the potential at said control electrode substantially fixed with respect to the negative terminal of said power supply, a first output terminal connected to said anode, and a second output terminal connected to said power supply.

2. A photocurrent amplifier comprising: a power supply having positive and negative terminals, an electron tube having an anode, a cathode and a control electrode, at least two photoconductors connected in parallel between said cathode and the negative terminal of said power supply, a resistor connected from said anode to the positive terminal of said power supply, means to maintain the potential at said control electrode substantially fixed with respect to the negative terminal of said power supply, a first output terminal connected to said anode, and a second output terminal connected to said power supply.

3. A photocurrent amplifier comprising: a power supply having positive and negative terminals, an electron tube having an anode, a cathode and a control electrode, a photoconductor connected between said cathode and the negative terminal of said power supply, a resistor connected from said anode to the positive terminal of said power supply, a feedback amplifier connected between the cathode and the control electrode of said electron tube, a first output terminal connected to said anode, and a second output terminal connected to said power supply.

4. A photocurrent amplifier comprising: a power supply having positive and negative terminals, an electron tube having an anode, a cathode and a control electrode, at least two photoconductors connected in parallel between said cathode and the negative terminal of said power supply, a resistor connected from said anode to the positive terminal of said power supply, a feedback amplifier connected between the cathode and the control electrode of said electron tube, a first output terminal connected to said anode, and a second output terminal connected to said power supply.

References Cited in the file of this patent

UNITED STATES PATENTS 1,653,694   Branson _____ Dec. 27, 1927